Jan. 2, 1951     P. A. SPURR     2,536,580
POWER SUPPLY SYSTEM
Filed Feb. 28, 1948

Inventor
PHILIP ANTHONY SPURR.
By
Blair Curtis & Hayward
Attorneys

Patented Jan. 2, 1951

2,536,580

UNITED STATES PATENT OFFICE 2,536,580

POWER SUPPLY SYSTEM

Philip Anthony Spurr, Cambridge, England, assignor to Pye Limited, Cambridge, England, a British company Application February 28, 1948, Serial No. 12,035
In Great Britain February 27, 1947

5 Claims. (Cl. 321—15)

The present invention relates to a high voltage power supply system in which the high voltage is derived from high frequency currents by suitable transformation, voltage multiplication and rectification. In such apparatus the rectification and voltage doubling when provided is generally effected by thermionic devices. In view of the high frequencies employed only relatively small smoothing capacities are necessary.

According to the present invention the winding on the transformer supplying the filament voltage to a thermionic device of the apparatus is constructed in the form of a condenser electrode which co-operates with a second electrode, which may be a second winding on the transformer for feeding the filament of another thermionic device to constitute the smoothing condenser of the apparatus. The windings may for example be produced by winding strip metal around the transformer core, two or more such strips being wholly or partly interleaved and insulated from one another to form the windings for feeding the heaters or filaments of the valves and also the smoothing condensers.

In applying the invention to a D. C. power supply arrangement operating from high frequency alternating current and comprising two valves connected in voltage-doubling arrangement, one plate of the smoothing condenser connected between the two filaments of the two rectifying diodes is constituted by a strip metal winding on the transformer, from which winding the filament heating current for one of the valves is derived. The second plate of this condenser is constituted by a similar insulated winding serving for supplying the filament heating current to the second diode. This second winding also constitutes one of the plates of the second condenser connected between the filament of this second diode and the other output lead from the apparatus, the second plate of which is constituted by a further insulated winding of strip metal connected to the said other output lead. This third winding serves merely as a condenser plate.

The three windings may be interleaved with insulating material interposed therebetween or may be only partly interleaved depending upon the number of turns necessary for the producing of the required filament heating voltages and the desired capacities of the smoothing condensers.

In order that the invention may be more clearly understood reference will now be made to the accompanying drawings, in which.

Figure 1:
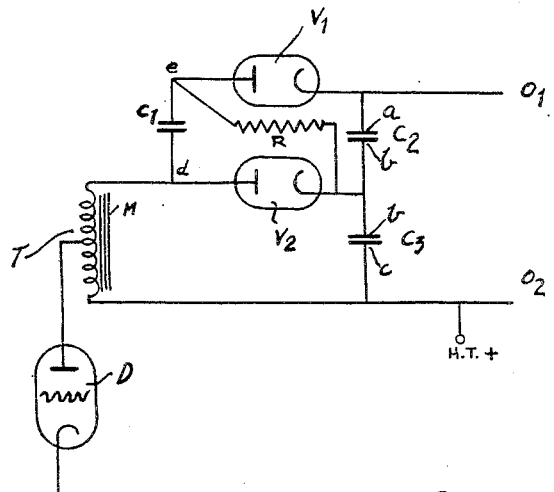
Fig. 1 shows a circuit diagram of a D. C. power supply arrangement to which the present invention relates.

Referring to Fig. 1 which shows a conventional D. C. power supply arrangement operating from high frequency alternating current, the output from the high frequency driver oscillator valve D is fed through the transformer T to a voltage-doubling and rectifying circuit comprising two rectifying valves V1, V2, the coupling condenser C1, the resistance R and the smoothing condensers C2, C3 being employed in order to obtain the desired step-up in voltage and the smoothing of the rectified output supplied through the output leads O1 and O2. The transformer winding T may comprise a single winding tapped at an appropriate point or two series connected windings tapped at their joining point, the tapping being connected to the anode of the valve D. The high tension supply is connected to the lead O2.

The mode of operation of the circuit is as follows:

The anode of valve D will make voltage excursions positively and negatively with respect to the potential of the high tension supply. The function of the tapping on the transformer T is to cause this oscillatory action to be amplified so that the point $d$ follows the waveshape of the anode potential but at a greater amplitude. When point $d$ is positive with respect to condenser plate $c$ current flows through valve V2 and charges condenser C3 to nearly the same potential. Thus condenser C3 obtains a charge which is nearly equal to the peak positive potential at $d$. This charge is prevented from escaping to $d$ by the rectifying action of valve V2. However, when the potential at point $d$ falls negatively, there will be a difference of potential between point $e$ and condenser plate $b$ due to lack of charge, initially, on condenser C1. Current therefore flows through resistance R from condenser C3 and charges condenser C1. When the point $d$ again rises in potential to a positive value, it carries point $e$ with it so that $e$ reaches a peak potential equal to that at $d$ plus the charge on condenser C1. This causes current to flow through valve V1 to charge condenser C2. The resistance R limits the current that can flow from e to b during this part of the cycle. This cycle of events is repeated at high frequency so that condensers C1, C2 and C3 all retain charges about equal in magnitude to the positive excursion at point $d$. Thus, at the output lead O1 is produced a substantially direct voltage approximately equal to twice the peak positive potential at point $d$.

According to the present invention, the plate $a$ of the condenser C2 connected between the filaments of the two rectifying valves V1 and V2 is constituted by a strip metal winding on the transformer T, from which winding the filament heating current for the valve V1 is derived. The second plate $b$ of this condenser C2 is constituted by a similar winding on the transformer, which serves for supplying filament heating current to the second diode V2 and is so insulated and spaced from the winding constituting the plate $a$ that the desired capacity for the condenser C2 is obtained.

This second winding also constituted the plate $b$ of the second condenser C3 connected between the filament of the diode V2 and the output lead O2 from the apparatus. The second plate $c$ of condenser C3 is constituted by a further winding of strip material upon the transformer T which is insulated from the winding $a$ and $b$ and is of such dimensions and disposition that the required capacity for the condenser C3 is produced. This third winding serves merely as a condenser plate and is connected to the output lead O2.

Figures 2, 2A:
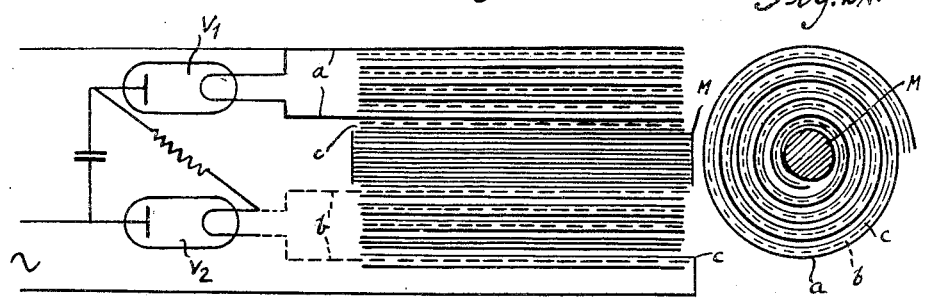
Fig. 2 shows diagrammatically the method of constructing the transformer windings, for supplying the filament voltages, in the form of condensers.
Fig. 2a shows an end view of the winding arrangement.

Figs. 2 and 2a show diagrammatically the arrangement of the windings, from which it will be seen that the three windings comprise three strips of metal $a$, $b$ and $c$ which are wound spirally in interleaved fashion around the core M of the transformer T with insulation (not shown) therebetween, each winding being of a sufficient number of turns to supply the necessary filament heating voltages and to produce the desired capacities therebetween. The filaments of the two valves are connected across the ends or other appropriate points of the windings.

Figure 3:
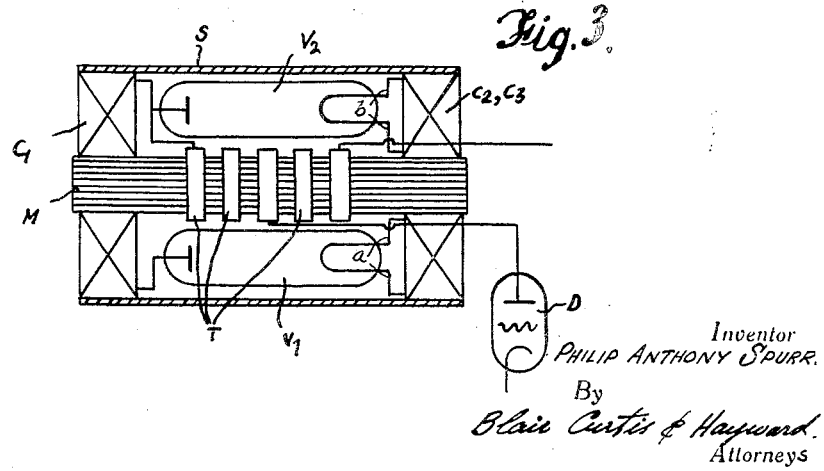
Fig. 3 shows diagrammatically a constructional embodiment of a power supply unit according to the invention.

Fig. 3 shows a practical embodiment of a power supply unit according to the invention. The coil T of the transformer fed from the high frequency driver oscillator valve D is arranged upon the magnetic core M, the filament heating windings $a$, $b$, $c$ of strip metal, which also constitute the output smoothing condensers C2 and C3, being wound around one end of the core in spiral fashion. The condenser C1 for coupling the anodes of the two valves in voltage doubling arrangement is wound in like manner around the other end of the core M, and the two rectifying diodes V1 and V2 are positioned between the condenser windings disposed at opposite ends of the core M. The complete rectifying and smoothing unit is enclosed within a suitable casing S.

I claim:

1. Apparatus for producing a high D. C. voltage from a high frequency current comprising a transformer fed from a high frequency oscillator, a plurality of thermionic valves connected in voltage multiplying arrangement to one of the output leads of said transformer, said valves also serving for rectifying the high frequency alternating current, a strip metal winding on said transformer connected to feed filament heating current to the filament of one of said valves, a second strip metal winding on said transformer connected for supplying filament heating current to another of said valves and coupled to said first winding to form a smoothing condenser, and a third strip metal winding on said transformer coupled with said second winding to form a condenser, and connected to the other high voltage output lead of said transformer.

2. Apparatus for producing a high D. C. voltage from a high frequency current, comprising a transformer, two thermionic valves connected in voltage multiplying arrangement to one of the output leads of said transformer, a strip metal winding on said transformer connected to feed filament heating current to the filament of one of said valves, a second strip metal winding on said transformer connected for supplying filament heating current to the other of said valves and coupled to said first winding to form a smoothing condenser, and a third strip metal winding on said transformer coupled with said second winding to form a condenser, and connected to the other high voltage output lead of said transformer.

3. Apparatus as claimed in claim 1, wherein the windings are wound in spiral fashion around the core of the transformer with insulating material interposed therebetween.

4. Apparatus as claimed in claim 2, wherein the said three windings are disposed at one end of a magnetic core, and two further strip like windings are arranged at the other end of the core to constitute a condenser coupling the anodes of the two thermionic valves, the other windings of the transformer being positioned on the central portion of the core and the two rectifying valves being positioned between the two outer sets of strip windings.

5. Apparatus for producing a high D. C. voltage from a high frequency current comprising a transformer fed from a high frequency oscillator, a plurality of thermionic valves connected in voltage multiplying arrangement to one of the output leads of said transformer, said valves also serving for rectifying the high frequency alternating current, a strip metal winding on said transformer connected to feed filament heating current to the filament of one of said valves, and a second strip metal winding on said transformer connected for supplying filament heating current to another of said valves and coupled to said first winding to form a smoothing condenser.

PHILIP ANTHONY SPURR.

REFERENCES CITED

The following references are of record in the file of this patent:

UNITED STATES PATENTS

| Number | Name | Date |
|---|---|---|
| 1,905,044 | Morrison | Apr. 25, 1933 |

OTHER REFERENCES

Radio Freq. H. V. Supplies—Schade, St. 235, Apr. 1943, R. C. A.